June 23, 1925.

W. S. LEMMON

RESONANT CONVERTER

Filed Jan. 14, 1920

Inventor
Walter S. Lemmon
Pennie, By Davis, Marvin & Edmonds
his Attorneys

June 23, 1925.

W. S. LEMMON

RESONANT CONVERTER

Filed Jan. 14, 1920

Inventor
Walter S. Lemmon
By Pennie, Davis, Marvin & Edmonds
his Attorneys

Patented June 23, 1925.

1,543,475

UNITED STATES PATENT OFFICE.

WALTER S. LEMMON, OF NEW YORK, N. Y.

RESONANT CONVERTER.

Application filed January 14, 1920. Serial No. 351,331.

*To all whom it may concern:*

Be it known that I, WALTER S. LEMMON, a citizen of the United States, residing at New York, in the county of New York, State of New York, have invented certain new and useful Improvements in Resonant Converters; and I do hereby declare the following to be a full, clear, and exact description of the invention, such as will enable others skilled in the art to which it appertains, to make and use the same.

My invention relates to the production and application of a simple and inexpensive apparatus capable of producing from an available continuous current source an alternating current of any desired frequency within wide limits and of very pure sine wave form. When the arrangement is applied to the production of oscillations in radio signalling systems, for example, the alternating current of pure sine wave form can be utilized to produce radio frequency oscillations of a remarkably uniform character which, when received by means of the ordinary radio receiving set including a telephone, will produce in the telephone a pure and easily distinguished musical note.

For the production of such alternating currents, I make use of an electrical circuit having inductance and capacity so adjusted that the circuit has a natural period of oscillation corresponding to the desired frequency of the alternating current to be produced, and I provide means for alternately connecting this resonant circuit to and disconnecting it from the continuous current charging source at a rate and for successive time periods substantially corresponding to the natural time period of charge and discharge of the resonant circuit. In this way energy is applied from the said source to charge the resonant circuit at its natural time period, and the charging current is interrupted at an instant of substantially zero current flow and without objectionable sparking. Upon disconnecting the resonant circuit from the charging source a short-circuiting discharge path is established for the charged resonant circuit through which the discharge takes place in accordance with the natural time period of the resonant circuit and during the period of disconnection from the charging source. The alternating current energy of pure sine wave form thus produced in the resonant circuit may be transferred to any other circuit (such, for example, as the spark-gap circuit of a radio-signalling system or modulating circuit of a modulated continuous wave system) by means of a transformer, as will be understood.

In the particular arrangement of apparatus according to the present invention, the rotating circuit controller which serves to alternately connect the resonant circuit to and disconnect it from the charging source, in the manner above described, serves also as the means for establishing the short-circuiting discharge path for the resonant circuit. With such an arrangement, which has many practical advantages, it becomes necessary to guard against destructive short-circuiting of the charging source, and this must be done if the purposes of the present invention are to be attained, without altering the natural time period of charge and discharge of the resonant circuit and without destroying the oscillatory character of that circuit. To this end the hereinafter described arrangement is such that there is interposed between the charging source and the short-circuiting discharge path for the resonant circuit a non-inductive current-limiting resistance, which is not, however, included in the short-circuiting discharge path, and does not alter the charging or discharging time period of the resonant circuit or reduce the oscillatory qualities of that circuit.

The nature of the invention will be more fully understood from the accompanying drawings, illustrating several embodiments and applications thereof, and from the following description.

Figure 1:
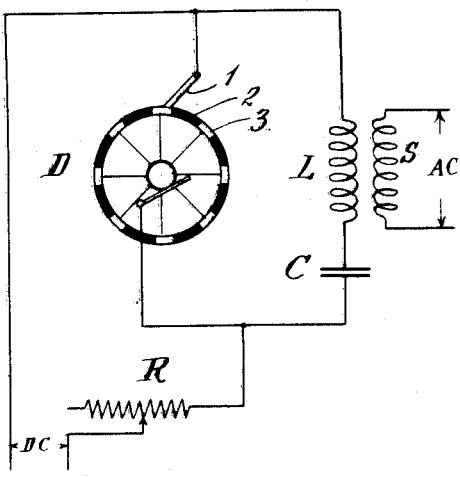
Fig. 1 represents the arrangement in its simplest form wherein a direct current circuit containing a current-limiting resistance is made and broken by a rotating controller.

In the arrangement of Fig. 1, the source of continuous current, indicated by the letters DC is connected through a preferably adjustable current-limiting resistance R to a closed oscillatory circuit containing the rotary circuit controller B, inductance L, which is the primary of a transformer, and the condenser C. It will be observed that the direct current source is so connected to the closed oscillatory circuit as to divide that circuit into two paths, one of which contains the circuit controller D and the other of which contains the inductance and capacity. In other words, the oscillatory circuit is, in its relation to the direct current source, made up of two parallel paths, one of which, containing the inductance and capacity, is capable of absorbing energy from the direct current source when the direct current circuit through the rotary controller is interrupted; and the other of which affords a discharge path of negligible impedance for the stored energy when the circuit through the controller is closed.

With the parts thus arranged the rotation of the controller will periodically interrupt the discharge path causing the direct current to be shunted into the other parallel path containing the inductance and capacity thereby storing energy in this portion of the circuit. When the rotary controller brush 1 has passed over an insulated segment such as 2 and comes upon the next conductor segment such as 3, the closed circuit is then completed and the stored energy will discharge itself through the closed circuit, and if the circuit through the controller remained closed, would, because of the inductance and capacity in the circuit, gradually dissipate itself in the form of damped electrical oscillations. If, however, the speed of the rotary controller and the length of the alternate conductive and insulated segments of the rotary controller are such that the circuit is made and broken at intervals which correspond substantially to the natural frequency of the oscillatory circuit, then the change of circuit connections may be effected without objectionable sparking at the brushes even with heavy currents, and an alternating current of constant amplitude will flow in the transformer primary L. Consequently, energy in the form of a constant amplitude alternating current may be supplied to a consumption circuit through the instrumentality of the transformer secondary S.

Experiments have shown that in such an arrangement when the rotary controller is adjusted to break the charging circuit at the instant of minimum current flow, i. e., when the interruptions occur at intervals corresponding with the natural frequency of the oscillatory circuit, then there is substantially no sparking and the alternating current is of a remarkably pure sine wave form. This condition affords, of course, an efficient transfer of energy to the consumption circuit, and is fulfilled when the rotary controller operates to charge and discharge the oscillatory circuit at a frequency corresponding to the natural ferquency of this circuit. In the design of the rotary controller the conducting and insulating segments should be made of such length that the time of supplying energy to the oscillatory circuit is made equal to the time required to discharge the oscillatory circuit through the rotary controller. If a contact brush of negligible width is used, the segments should be of equal length. If the contact brush has appreciable width the insulating segment should be of a length equal to the length of the conducting segments plus twice the effective brush width, as will be understood. With these conditions satisfied, the speed of the rotary controller may be readily regulated so that the frequency of charge and discharge corresponds with the frequency to which the oscillatory circuit is tuned. As the speed of rotation of the rotary controller departs from synchronism with respect to the natural frequency of the oscillatory circuit, then the sparking increases and the transfer of energy is effected with less efficiency. However, experiments indicate that the adjustment of the oscillatory circuit for various controller speeds is not as critical as might be at first supposed.

From the foregoing description it will be seen that in accordance with my present invention the oscillatory circuit containing the inductance L and capacity C is periodically charged and discharged at a frequency corresponding to the natural frequency of the circuit itself. It will also be observed that the time period of the oscillatory circuit is substantially the same during both the charging and discharging actions, since the effective inductance and capacity of this circuit under both charging and discharging conditions are for all practical purposes determined by the inductance L and capacity C. Thus, the effective inductance and capacity, and hence the time period, of the oscillatory circuit, are substantially the same whether the circuit is connected to the source of direct current energy for charging, or short-circuited through the rotating controller for discharging. The amount of energy delivered to the oscillatory circuit by the direct current source can, obviously, be adjusted by means of the adjustable current-limiting resistance R, and since this resistance is non-inductive, such adjustment does not affect the natural frequency of the oscillatory circuit, but merely alters the amplitude of the resulting alternating current. It will further be evident that the frequency of the alternating current produced in accordance with the present invention may be changed by suitably adjusting the inductance and capacity of the oscillatory circuit with a corresponding adjustment of the speed of the rotary controller C to maintain the resonant combination of the invention.

Figure 2:
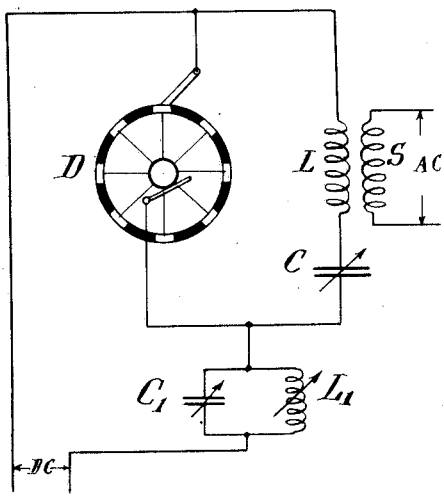
Fig. 2 represents a modification of the arrangement shown in Fig. 1, in which a tuned oscillatory circuit constituting an equivalent resistance is inserted in the direct current circuit.

In Fig. 2 there is shown an arrangement in which a second tuned oscillatory circuit comprising an inductance $L_1$ and a capacity $C_1$ is substituted for the current-limiting resistance of Fig. 1. In its current-limiting function such a circuit is the equivalent of the non-inductive resistance R. At the same time there will be set up in the circuit $L_1C_1$ local electric oscillations having a frequency corresponding to the natural frequency of oscillation of that circuit. If now the circuit $L_1C_1$ is tuned to the same frequency as the circuit LC, the oscillations in the two tuned circuits will have the same period and will be in phase with one another. As in the case of the arrangement shown in Fig. 1, if the rotary controller is rotated at a frequency in synchronism with the natural frequency of the two oscillatory circuits, energy in the form of a constant amplitude alternating current may be supplied to a consumption circuit through the instrumentality of the transformer secondary S.

Figure 3:
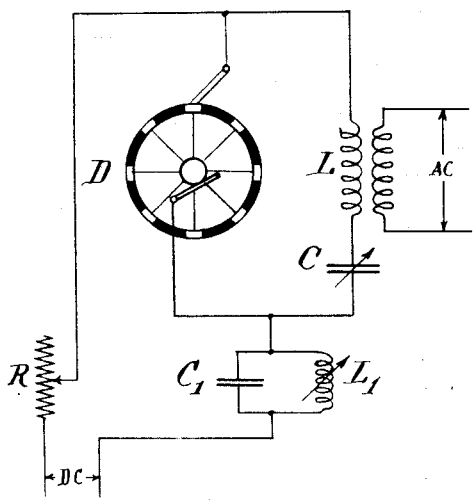
Fig. 3 represents a modification of the arrangement shown in Fig. 1, in which both an oscillatory circuit and a current-limiting resistance is inserted in the direct current circuit.

In the arrangement of circuits shown in Fig. 3, the current-limiting function is performed by both a non-inductive resistance R and an oscillatory circuit comprising an inductance $L_1$ and a capacity $C_1$. The action of the resistance R and the oscillatory circuit $L_1C_1$ is substantially that as described in connection with Figs. 1 and 2, respectively. The arrangement has the advantage, as compared with that of Fig. 2, that fine adjustment of the power input may easily be made.

Figure 4:
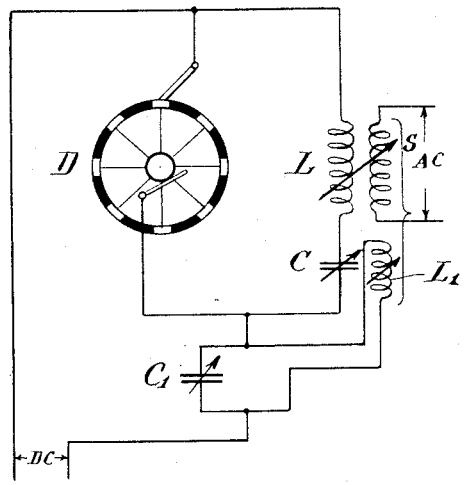
Fig. 4 represents an arrangement in which the oscillations in the output circuit are strengthened.

If the circuit $L_1C_1$ is tuned as above suggested, to the same frequency as the circuit LC and is then coupled to the circuit LC or to the consumption circuit, the energy of the oscillations in circuit $L_1C_1$ may be made effective to strengthen the oscillations supplied to the consumption circuit. Such an arrangement is shown in Fig. 4, in which the inductance $L_1$ of the circuit $L_1C_1$ is coupled to the inductance S of the consumption circuit. With this arrangement the electrical oscillations occurring in the oscillatory circuit $L_1C_1$ are effectively added to and increase the amplitude of the oscillations generated in the oscillatory circuit LC.

Figure 5:
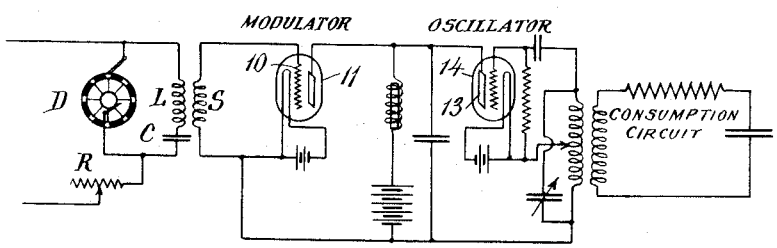
Fig. 5 represents an application of the arrangement of Fig. 1 to a modulated continuous oscillation generating system.

The arrangement of Fig. 5 shows the application of the invention to a modulated oscillator, it being understood that any of the arrangements of Figs. 1 to 4 may be used. The alternating currents of pure sine wave form are supplied to the control electrode 10 of a thermionic discharge device 11 through the instrumentality of the transformer secondary S, the current variations thus produced in the thermionic device 11 being made effective on the anode 13 of the thermionic oscillator 14. The modulated continuous electrical oscillations generated by the thermionic oscillator may be supplied to any consumption circuit, for example, the radiating circuit of a wave signalling system.

This system of sine wave modulation possesses many advantages over the existing modulated continuous wave systems. An extremely pure sine wave modulation giving an easily distinguished tone may be effected; the tone of the modulation is variable over an extremely wide range by the variation in the speed of rotation of the rotary controller C with a corresponding adjustment of the oscillatory circuit or circuits; the system is very simple and reliable and the modulation is substantially constant for a given speed of rotation of the rotary controller. An added feature which is of considerable advantage in modulated continuous wave signalling systems, is that the degree of modulation can be varied without change of tone by regulating the amount of input current from the energy source.

Figure 6:
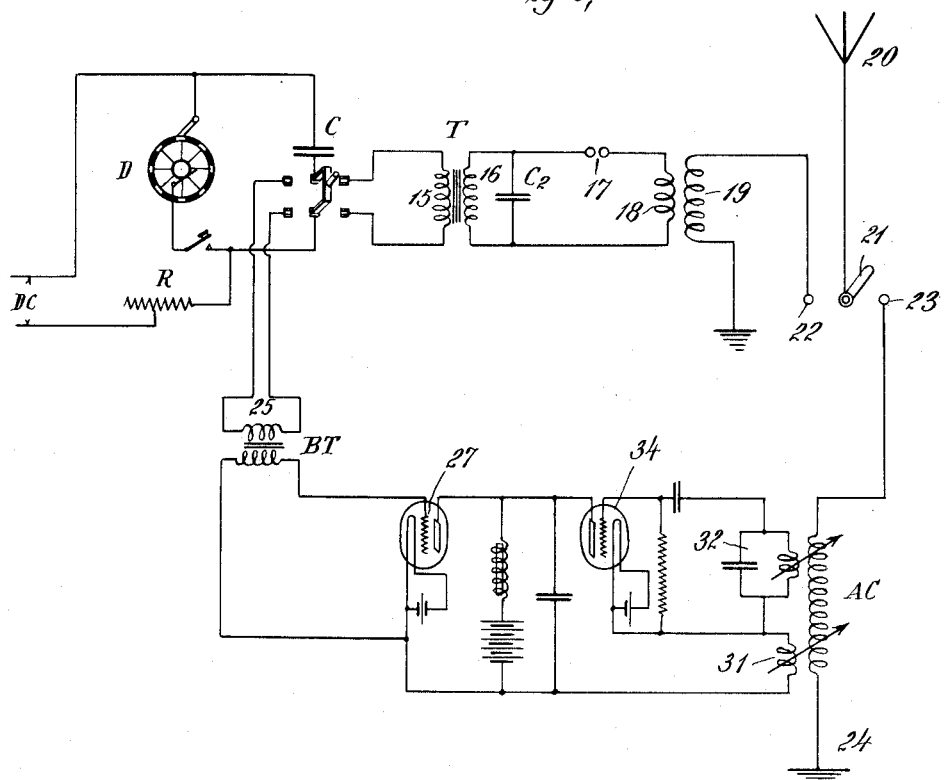
Fig. 6 represents an arrangement in which the generated alternating current may be selectively applied for use in either a damped or undamped wave signalling system.

In Fig. 6 there is shown an arrangement by which a system of circuits embodying the above-described principles may be combined with other circuits in such a manner as to serve either as a modulator of undamped oscillations or as a generator of damped oscillations, so that the same set may serve at once as a modulator for a relatively high power undamped wave transmitter of the thermionic oscillator type, for example, or as a standby or auxiliary transmitter in case of need. The oscillatory circuit connected across the rotary controller comprises in one case the primary 15 of the transformer T and in the other case the primary 25 of the transformer BT. When transformer T is utilized the alternating current is applied to a damped wave signalling system through the secondary 16 of the transformer T, which serves to charge the condenser $C_2$ in the usual manner, the circuit $C_2$ 18 discharging through the spark gap 17 which may be either a quenched gap, an open gap or a rotary gap mounted on the same shaft as, or driven in synchronism with, the rotary circuit controller. The oscillations are then transferred to the antenna 20 through instrumentality of the oscillation transformer 18, 19 in the usual manner, the transfer switch 21 making contact with the terminal 22 to complete the radiating circuit. When the transformer primary 25 is utilized with the condenser C to form the oscillatory circuit, the alternating currents are applied to the control electrode 27 of an electron discharge device and serve to modulate the continuous oscillations generated by a thermionic oscillator 34 in the manner described in connection with Fig. 5. The regenerative or feed-back coupling coil 31 serves to maintain continuous oscillations in the thermionic oscillator 34. The circuit 20—24 should be tuned to the frequency of the circuit 32, as is customary. The radiating circuit is completed when the switch 21 makes contact with the terminal 23.

Although the primary purpose of the invention is, as above set forth, to produce from a direct current an alternating current of constant amplitude by supplying energy in the form of a direct current to the resonant circuit and permitting the stored energy to oscillate in the said circuit in substantial synchronism with the natural frequency of the circuit, nevertheless it is possible to supply the energy to the resonant circuit in the form of an alternating current, and permit the stored energy to discharge itself as before, and I consider such an arrangement within the broad scope of my invention.

I claim:

1. An arrangement for producing sinusoidal alternating current comprising a direct current source, inductance and capacitance elements connected in series across the terminals of said source, an interrupter connected across the terminals of said source, and an oscillatory circuit tuned to the frequency of the alternating current to be produced, said oscillatory circuit being connected in series between said source and said elements.

2. An arrangement for producing sinusoidal alternating current comprising a direct current source, inductance and capacitance elements connected in series across the terminals of said source, an interrupter connected across the terminals of said source, and an oscillatory circuit tuned to the frequency of the alternating current to be produced, said oscillatory circuit comprising an inductance and capacitance connected in parallel and connected in series between said source and said elements.

3. An arrangement for producing sinusoidal alternating current comprising an interrupter, an inductance element and a capacitance element connected in series across the terminals of said interrupter, a source of direct current connected across the terminals of said interrupter, said interrupter being adapted to periodically close an oscillatory circuit including said elements for periods corresponding substantially to one-half the natural period of said oscillatory circuit, and an oscillatory circuit tuned to the frequency of the alternating current to be produced, said oscillatory circuit comprising an inductance and capacitance connected in parallel and connected in series between said source and said elements.

4. An arrangement for producing sinusoidal alternating current comprising an interrupter, an inductance element and a capacitance element connected in series across the terminals of said interrupter, a source of direct current connected across the terminals of said interrupter, said interrupter being adapted to periodically close an oscillatory circuit including said elements for periods corresponding substantially to one-half the natural period of said oscillatory circuit, and an oscillatory circuit tuned to the frequency of the alternating current to be produced, said oscillatory circuit comprising an inductance and capacitance connected in parallel and connected in series between said source and said elements, said last-mentioned inductance being inductively associated with said first-mentioned inductance element, the inductive relation being cumulative.

In testimony whereof I affix my signature.

WALTER S. LEMMON.